United States Patent Office 2,778,862
Patented Jan. 22, 1957

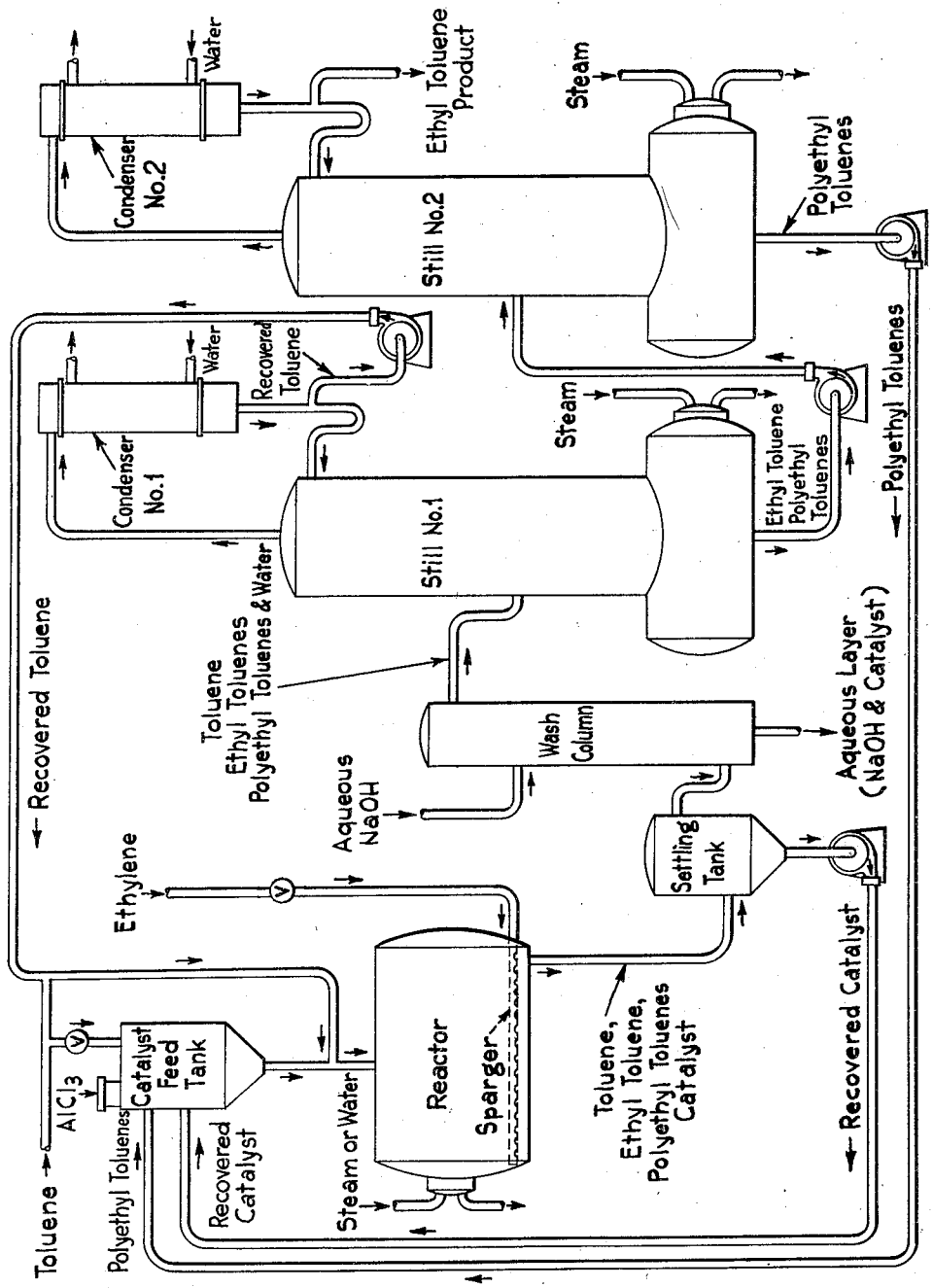

2,778,862

PROCESS FOR ETHYLATING TOLUENE

William F. Gorham, Glen Ridge, and John A. Stenstrom, Bloomfield, N. J., assignors to Union Carbide and Carbon Corporation, a corporation of New York Application May 19, 1953, Serial No. 355,923

5 Claims. (Cl. 260—671)

This invention relates to an improved process for ethylating toluene in the presence of catalytic amounts of aluminum chloride.

More particularly, an object of the present invention is to alkylate toluene with ethylene in the presence of aluminum chloride whereby high yields of mono-ethyl toluene isomers are obtained with the meta isomer being formed predominantly, the para isomer to a lesser extent, and the ortho isomer in minimum yields.

Another object of the invention is to minimize production of benzene, ethyl benzene, and polymethyl derivatives of toluene such as xylene, trimethyl benzene and the like, resulting from migration of methyl radicals from the toluene reactant normally induced by the use of Friedel-Crafts type catalysts such as aluminum chloride.

A further object of the present invention is the production of mono-ethyl toluenes in high yields, whereby toluene is converted to mono-ethyl toluenes at efficiencies approaching 98% of theoretical, and with substantially little or none of the toluene being alkylated to polyethyl toluenes.

The accomplishment of these objects and others made evident hereinafter will be readily understood as the description of our invention proceeds.

We have found that by alkylating toluene with ethylene in the presence of aluminum chloride at a reaction temperature less than 90° C. and which can be as low as 15° C., the migration rate of the methyl radical on the toluene molecule is at a minimum value, resulting in a reaction product consisting almost wholly of mono-ethyl toluenes, various polyethyl toluenes, and unreacted toluene. On the other hand, at reaction temperatures in excess of 90° C., the resultant reaction products are complex mixtures comprising toluene, benzene, ethyl benzene, xylene, trimethyl benzene, ethyl toluene and polyethyl toluenes which are exceedingly difficult to separate by conventional means, for example by fractional distillation.

Furthermore, we have found that by ethylating toluene with ethylene to equilibrium at a reaction temperature between 60° C. and 90° C. that the resultant content of polyethyl toluenes which has been formed when added to a subsequent same weight charge of toluene to be ethylated and employing the same toluene/ethylene molar ratio, and catalyst as in the initial reaction results in only mono-ethyl toluenes being produced in the second reaction, since the equilibrium weight per cent of polyethyl toluenes is already present in the reaction system, and hence none of the ethylene and toluene reactants of this subsequent charge are consumed in formation of additional polyethyl toluenes. Thus, after an initial alkylation reaction has been conducted according to our invention, no further production of polyethyl toluene occurs in all subsequent reactions conducted under substantially identical conditions as the first reaction, and hence yields up to 98% by weight of mono-ethyl toluenes are realized as well as efficiencies of up to 98% based on the toluene reactant.

The relative parts by weight of toluene, ethylene and polyethyl toluene can be varied and in each case the amount of mono-ethyl toluene obtained will approximate the equilibrium amount for that particular toluene/ethylene ratio. The preferred toluene to ethylene molar ratios are between 4:1 and 6:1, although ratios of 1:1 to 20:1 can be used if desired.

Constant equilibrium conditions on production of polyethyl toluene have only been obtained at alkylation-reaction temperatures between 60° and 90° C. At temperatures less than 60° C., which are nevertheless effective in substantially avoiding migration of the methyl radical on the toluene molecule during the alkylation reaction, it is exceedingly difficult to effect constant equilibrium yields of polyethyl toluenes, and this is believed to be caused by rapid decay of catalyst activity at these lower temperatures.

The polyethyl toluenes ordinarily formed at alkylation-reaction temperatures between 60 and 90° C. have as their major component diethyl toluene with smaller amounts of tri, tetra, and penta ethyl toluenes. Instead of such mixture, it is feasible to use any of the aforementioned specific polyethyl toluenes for recycle in subsequent alkylations.

The amounts of aluminum chloride catalyst may be varied, however, the preferred amounts are from 20 to 60% by weight of the ethylene used. In order to reduce the induction period, it is desirable to add hydrogen chloride or a substance capable of decomposing to form hydrogen chloride in the presence of aluminum chloride, for example any alkyl chloride of which ethyl chloride, butyl chloride, heptyl chloride are representative. Hydrogen chloride or alkyl chloride in amounts between one and five per cent by weight of the ethylene charge are adequate for the purpose of promoting catalyst activity, although larger amounts can be used if desired.

The reaction time can be as long, or as short as desired, being so regulated that practically complete absorption and reaction of the ethylene is accomplished. It should also be long enough to insure the attainment of equilibrium conditions. This usually requires 10 to 60 minutes additional heating after the reaction between toluene and ethylene has occurred.

The reaction can be run under a wide range of pressures from atmospheric to 300#/sq. in., although moderate pressures 60# gauge pressure are preferred.

The alkylation process can be conducted on a batch to batch basis, or on a continuous basis. Reference is had to the accompanying drawing showing schematically an arrangement of apparatus suitable for carrying out the present invention in a continuous manner.

In general, toluene, ethylene and aluminum chloride are fed continuously to the reactor. The ethylene gas is supplied at a pressure above the pressure desired for the reaction. Anhydrous aluminum chloride is fed in solid form. The aluminum chloride is introduced through a catalyst feed tank equipped with a screen to retain solid materials. To start the reaction, toluene is admitted to the reactor by way of the catalyst feed tank so that the tank is approximately filled with a saturated solution of aluminum chloride in toluene, that is one containing about 0.5% to 1.0% by weight of aluminum chloride. When continuous operation has been established, it is unnecessary to admit the toluene to the reaction by way of the catalyst feed tank for reasons which will presently appear, and it is admitted directly to the reactor.

The reactor is provided with coils through which either cooling water or steam can be recirculated. It may also be jacketed for the same purpose. Initially, heat is required, but the ethylation reaction is exothermic so that cooling is necessary after the desired temperature has been reached and the reaction started.

Ethylene gas is admitted beneath the liquid level in the reactor and is dispersed in the liquid by means of a sparger. The rate of ethylene feed is regulated to control the pressure on the contents of the reactor.

To start the process, the contents of reactor are heated to about 80° C. and sufficient ethylene is admitted to raise the pressure in the reactor to about 60 pounds per square inch gauge. An induction period usually is required for the formation in the reaction of the organo-aluminum chloride complex which is the actual catalyst. Thereafter, ethylation of the toluene proceeds, and toluene, ethylene and catalyst solution are admitted continuously while cooling is applied with such regulation of each of these as will maintain the conditions in the reactor substantially constant.

Product is withdrawn continuously from the reactor at a correspondingly regulated rate so that the contact time or dwell of materials in the reactor is from about 30 minutes to 4 hours. The product withdrawn contains unreacted toluene, ethyl toluene, polyethyl toluenes and catalyst.

The material from the reactor is admitted to about the mid-point of a settling tank for the removal of the catalyst. As is known, the active organo-aluminum chloride complex catalyst is a heavy, viscous material which, on the basis of contained aluminum chloride, is fully equivalent catalytically to new aluminum chloride. In the setting tank, up to 50% or more of this catalytic material settles out of the product, is withdrawn continuously from the bottom of the tank, and is returned to the catalyst feed tank for reuse. It can be satisfactorily transferred at this point by means of known devices, for instances an open impeller-type centrifugal pump can be used.

The supernatant liquid product overflows continuously from near the top of the settling tank and enters a wash column at a point near its base. Aqueous caustic is supplied to the upper portion of this wash column. The ethylated product has a specific gravity well below that of the aqueous solution, and so passes up the column countercurrent to the aqueous caustic solution. This washing serves to destroy and to remove from the product any aluminum chloride which was not separated and recovered in the settling tank. The water layer of caustic and removed catalyst residues leaves the bottom of the wash column and is discarded. The washed product is decanted from the top of the wash column, and now consists of toluene, ethylene toluene, and polyethyl toluenes, together with a very small amount of dissolved water.

The washed product is fed to the column of continuous still in which unreacted toluene is separated from the other material. The distillate of recovered toluene is returned to the toluene being fed to the reactor.

The residue from the base section of the still contains ethyl toluene and polyethyl toluenes as well as those small amounts of any higher boiling substances which occasionally are by-products of the original ethylation reaction. This residue is fed to the column of a second continuous still in which the product, ethyl toluene, is separated from the polyethyl toluenes. The ethyl toluene is obtained in pure form as the condensed distillate.

The residue, chefly polyethyl toluenes, is returned to the reaction system.

The invention is further illustrated in the following specific examples:

*Example 1*

In an alkylation vessel are placed 2270 parts (23.5 moles) of toluene, 55 parts of anhydrous aluminum chloride and 122 parts of polyethyl toluenes. The mixture is agitated, and 4 parts of ethyl chloride introduced. The agitated mixture is heated to 80° C. and 172 parts (6.14 moles) of ethylene are introduced into the reaction mixture during a period of 60 minutes whereby practically complete absorption and reaction of the ethylene is accomplished. The temperature is maintained at 80–85° C. during the reaction by means of a cooling bath. When the addition of ethylene is complete, the reaction mixture is maintained at a temperature of 80–90° C. with agitation for sixty minutes. The resulting mixture is then fractionally distilled and a yield of 720 parts of ethyl toluene B. P. 160–166° C. is obtained, consisting of 15% by weight of ortho ethyl toluene, 30% by weight of para ethyl toluene and 55% by weight of meta ethyl toluene. 121 parts of polyethyl toluenes are recovered for use in the subsequent Examples 2 to 6 described below.

*Examples 2 to 6*

In these runs the toluene/ethylene molar ratio was approximately 4 to 1 and the polyethyl toluenes from Example 1 were added to Example 2, that from Example 2 were added to Example 3, that from Example 3 to Example 4, that from Example 4 to Example 5 and that from Example 5 to Example 6. Otherwise the conditions including the catalyst were the same as in Example 1. The practically constant amount of polyethyl toluenes obtained in each run is evidence that no additional polyethyl toluenes are formed.

|  | Ex. 2 | Ex. 3 | Ex. 4 | Ex. 5 | Ex. 6 |
|---|---|---|---|---|---|
| Parts by Wt. of Toluene | 2,270 | 2,270 | 2,270 | 2,270 | 2,270 |
| Parts by Wt. of Ethylene | 158 | 157 | 158 | 161 | 155 |
| Parts by Wt. of Polyethyl Toluenes | 138 | 135 | 130 | 160 | 160 |

*Example 7*

100 pounds (1.1 pound moles) of toluene was charged to an alkylation vessel and 2.5 pounds of aluminum chloride, and 0.15 pound of ethyl chloride, and 5.35 pounds of polyethyl toluenes (from a previous example) were added. The agitated mixture was heated to 85° C. and 7.6 pounds (.27 pound mole) of ethylene was introduced into the mixture during a period of 60 minutes. The temperature was at 80–85° C. during the addition of the ethylene, and when this was complete the temperature was maintained at 80° C. for an additional 40 minutes. From the crude reaction product when fractionated there was obtained an approximately 100% yield (based on ethylene) of ethyl toluene and an efficiency of 97% based on toluene. The polyethyl toluene recovery was quantitative.

A sample of ethyl toluene obtained by fractionation of the crude reaction product of Example 7 was analyzed as follows. A known weight of sample was oxidized in permanganate solution to a mixture of phthalic acids. The solution was diluted to a large volume to dissolve the ortho phthalic acid (derived from ortho ethyl toluene). The water insoluble acids were separated into isophthalic acid (derived from meta-ethyl toluene) and terephthalic acid (derived from para-ethyl toluene) by means of their barium salts. After the oxidation and separation 46% (molar proportion) isophthalic acid and 23% (molar proportion) terephthalic acid were obtained (yield based on ethyl toluene). As neither step was quite quantitative, it is evident that the ethyl toluene contained a little more than 50% of the meta isomer and a little more than 25% of the para isomer, the remainder being the ortho isomer.

Further evidence for this isomer composition was obtained by examination of the infra-red spectrum, which indicated the composition to be approximately 55–60% meta, 25–30% para, and 10–20% ortho ethyl toluene.

A number of modifications of the procedures described in the preceding examples are possible. However, control of the temperature between 60–90° C. is an important feature of the process. As noted heretofore, reaction temperatures below 60° C. result in inefficient operation, and above 90° C. the reaction product is difficult to fractionate because of its complexity due to the extensive migration of the methyl group. This can be demonstrated as follows:

In the fractionation of a product obtained by the ethylation of toluene three main fractions are generally obtained.

1. A fraction boiling between 110–112° C. which is mostly toluene.
2. A fraction boiling between 112–159° C. which contains mostly toluene, ethyl benzene, xylene and some small amounts of ethyl toluene.
3. A fraction boiling between 160–166° C. which contains mostly ethyl toluene.

The amount of fraction 2 is an indication of the extent of migration of the methyl group, the larger the amount, the greater the migration. That this occurs with increasing temperature of reaction is shown by the following series of experiments, in which ethylene and toluene were reacted together using the molar proportions and catalyst concentration described in Example 1.

| Run No. | Avg. Temp., ° C. During Reaction | Weight in Grams of Fraction With B. P. 112–159° C. |
|---|---|---|
| 1 | 15–25 | 30 |
| 2 | 65–70 | 50 |
| 3 | 85–90 | 57 |
| 4 | 100–105 | 135 |

It is evident from the table that the amount of fraction 2 obtained at reaction temperatures of 100–105° C. is more than 2½ times greater than that obtained at temperatures below 90° C.

What is claimed is:

1. Process for producing monoethyl toluene which comprises the following steps—(1) reacting a mixture consisting of ethylene and toluene containing at least one mol toluene per mol of ethylene at a temperature between 60° C. and 90° C. in the presence of aluminum chloride until a constant equilibrium reaction product is obtained substantially free from methyl substituted benzenes other than toluene and comprising essentially a reaction product comprising mono-ethyl toluene isomers, polyethyl toluenes and toluene, (2) separating the polyethyl toluenes from the reaction product, (3) mixing the separated polyethyl toluenes with a reaction charge of ethylene and toluene in substantially the same molar proportions and amounts by weight as the reaction charge of step 1, and (4) reacting the mixture of step (3) according to step (1) at a reaction temperature between 60 and 90° C. and in the presence of aluminum chloride until a constant equilibrium reaction product is obtained substantially free from methyl substituted benzenes other than toluene, said reaction product comprising essentially mono-ethyl toluene isomers, toluene and an amount of polyethyl toluenes substantially equivalent to that obtained in step 1.

2. Process according to claim 1 in which the aluminum chloride constitutes from 20 to 60% by weight of the ethylene reactant.

3. Process according to claim 1 in which hydrogen chloride is added to the reaction mixture in an amount between about one and five percent of the weight of the ethylene reactant.

4. Process according to claim 1 in which the reacting is conducted under a pressure between atmospheric and 300 pounds per square inch.

5. Continuous process for alkylating toluene which comprises continuously feeding to a reaction vessel toluene and ethylene in molar ratios between 1 and 20 mols of toluene per mol of ethylene, reacting the toluene and ethylene together at a reaction temperature between 60° and 90° C. in the presence of aluminum chloride as catalyst until a constant equilibrium reaction product is obtained substantially free from methyl substituted benzenes other than toluene, continuously withdrawing from the reaction vessel said reaction product comprising essentially toluene, mono-ethyl toluene isomers and polyethyl toluenes, and aluminum chloride catalyst, separating the catalyst from the mixed reaction product and returning the catalyst to said reaction vessel, separating the polyethyl toluenes from the mixed reaction product and recycling said polyethyl toluenes to the reaction vessel, and recovering mono-ethyl toluenes from the mixed reaction product by distillation.

References Cited in the file of this patent

UNITED STATES PATENTS

| 1,953,702 | Davidson | Apr. 3, 1934 |
| 2,302,721 | Schmerling | Nov. 24, 1942 |
| 2,364,203 | Francis et al. | Dec. 5, 1944 |
| 2,694,095 | Medcalf et al. | Nov. 9, 1954 |

OTHER REFERENCES

Berry et al.: J. A. C. S., vol. 49, pp. 3142–9 (Dec. 1927).

Organic Reactions, vol. III, p. 45 (1946). John Wiley & Sons Inc.